April 12, 1938.  C. DELALANDRE  2,113,879
LIFTING APPARATUS
Filed Sept. 27, 1935
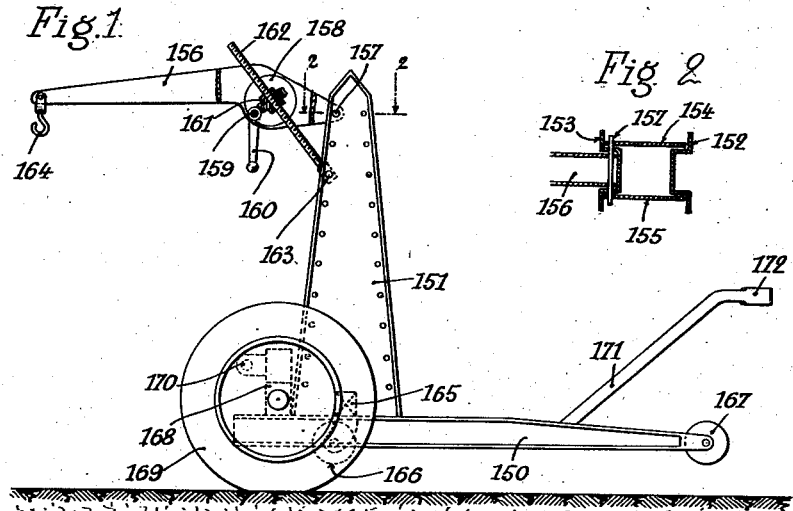
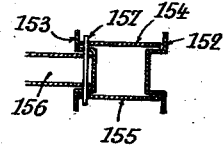
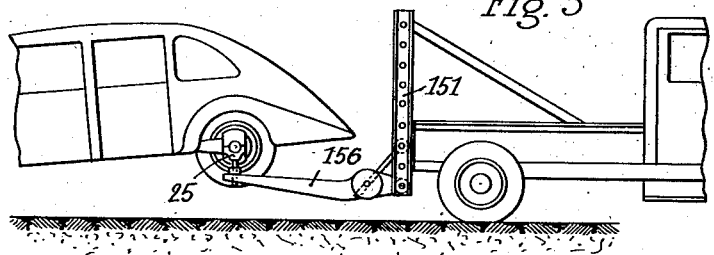
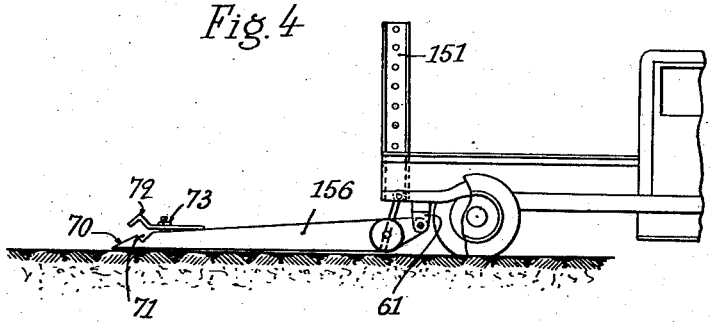
C. Delalandre
Inventor
By: Glascock Downing & Seebold
Attys.

Patented Apr. 12, 1938

2,113,879

UNITED STATES PATENT OFFICE 2,113,879

LIFTING APPARATUS

Camille Delalandre, Suresnes, France

Application September 27, 1935, Serial No. 42,522
In France October 3, 1934

6 Claims. (Cl. 212—8)

The present invention relates to a lifting apparatus adapted to be used in particular for lifting and transporting motor vehicles and their parts, and it has for its object to provide an apparatus which may be moved on rollers for garage or workshop services, or converted into a trailer for road circulation, in view of relieving motor vehicles in distress.

The invention has also for its object to provide a unitary lifting apparatus which will be able to replace both the usual rolling jacks, the cranes mounted on trucks and the motor vehicles which are provided to the rear with a jack and a pulley-block for relieving cars in distress, thus replacing an expensive and cumbersome outfit by a single apparatus adapted to perform the various functions of said outfit.

Further features of the invention will be set forth in the following description, with reference to the accompanying drawing in which:

Figure 1 is a side view of an apparatus according to the invention.

Figure 2 is a cross-section on the line 2—2 of Figure 1.

Figures 3 and 4 illustrate the invention as applied to a lorry for relieving cars in distress.

In the embodiment of Figures 1 and 2, the apparatus comprises a frame 150, to which is secured an upright 151, formed by suitably shaped sheet metal bars 152—153 (Fig. 2), assembled by means of sheet metal strips 154—155, in order to form a hollow girder having on each side a substantially vertical groove.

The end of jib 156 may engage in either of these grooves and is pivotally held in place at any desired level by means of a bolt 157, engaging any one of the pairs of registering holes which are provided along each groove, at a suitable spacing.

Jib 156 has an enlarged portion in which is pivotally mounted a block 158, serving as a support for a worm 159, actuated by means of a crank 160. Worm 159 meshes with a worm-wheel cut at the periphery of a nut 161, screwing on a screw threaded rod 162. Said rod ends in an eyelet 163, which may be pivotally connected to the upright by means of a bolt passing through any one of the pairs of holes of the upright in the same manner as for jib 156.

This latter is fitted for example with a hook 164 or with any other attaching means.

The frame carries a cross-member on the ends of which are mounted rollers 166, further rollers 167 being provided at the rear end of the frame. The frame also carries an axle 168, on which pneumatic tire wheels 169 may be mounted for road circulation. On axle 168 is secured a coupling member 170. The rear part of the frame carries two inclined bars 171, adapted either for moving the apparatus by hand, or for coupling the same with the rear of a lorry or truck, by means of a coupling member 172.

The angular movements of the jib are controlled by the crank 160, which rotates nut 161, this latter moving along the rod 162. Variation of the angle between the rod 162 and the jib 156 is allowed by the rotation of block 158 within the enlarged portion of jib 156.

It will be appreciated that jib 156 and rod 162 may be attached to upright 151 at the level which is the most suitable for the work to be performed, either upon the front face or upon the rear face of the upright, the jack being either above or below the jib.

When jib 156 is hooked towards the lower end of upright 151, it is adapted to raise a load after the manner of a lifting jack.

When jib 156 is arranged at the upper part of upright 151 it operates like a crane, the small overall size of jib 156 allowing the same to be introduced within the body of an inside steering car, for the removal of a gear-box for example.

Finally, when frame 150 is provided with the pneumatic tire wheels 169 it may be attached to a towing car by means of coupling member 172.

The above methods of utilization are given solely for the purpose of illustration and it is obvious that the apparatus may be used in widely different manners.

Thus, it may be advantageous in certain cases to secure the lifting device directly to a towing car, (Fig. 3). This may be done through the medium of a vertical upright, similar to upright 151, for the purpose of locating the jib at any suitable level and in particular for permitting of suspending thereto a car in distress.

Figure 3 illustrates the case where the apparatus is used for relieving a car resting upon jib 156 through its rear axle, through the medium of a supporting block 25.

The jib may also be directly pivoted to the frame of the towing car by means of a bracket 61 arranged below the frame of the towing car (Fig. 4).

However, difficulties are encountered by the garage men for raising motor-cars of the so-called aerodynamic type; these are due to the fact that, in such cars, all the strong parts which would otherwise serve for the suspension of the car to be relieved are covered by the body. These difficulties may be overcome by causing the jib to pass below the car to directly fit to the rear or front axle. For this purpose, the jib, or a fitting attached thereto, may be given such a shape as to be readily secured below the axle, even when the latter rests on the ground.

The end of the jib may have for example an inclined face or wedge 70 and a notch 71, as shown in Figure 4. A hook 72, provided with a tightening nut 73, is adapted to clamp in place an axle resting in notch 71. These parts may conveniently be arranged on a fitting, adapted to be secured to the end of the jib. It will be understood that, with an axle lying on the ground, the jib may readily pass below the same, inasmuch as, during the backward movement of the towing car, the jib will be driven into the ground, or the wedge 70 will raise the axle, which thereafter drops into notch 71.

Having now described my invention what I claim as new and desire to secure by Letters Patent is:

1. A lifting device of the type referred to, comprising a frame, rollers for supporting said frame for workshop handling, an axle, two hubs on said axle, for removably attaching conventional motor vehicle wheels, for road use, an upright secured to said frame, and consisting of a hollow girder, having substantially vertical grooves on two opposite faces, series of registering holes in the sides of said grooves, a jib having a hole at its inner end adapted to enter either of said grooves, a bolt adapted to enter a pair of said holes for selective connection of said jib with said upright, a jack pivoted to said jib and having a hole at its inner end adapted to enter either of said grooves, and a bolt adapted to enter another pair of said holes for selective connection of said jack with said upright.

2. A lifting device as claimed in claim 1, wherein said jack comprises a block rotatably mounted in said jib, a nut rotatably supported in said block, a screw-threaded rod engaging said nut, a helical toothing on said nut, a worm rotatably supported in said block and meshing with said toothing, and means for rotating said worm.

3. A lifting device of the type referred to, comprising an upright provided with pairs of registering holes, a jib having a hole at its inner end, a bolt adapted to enter a pair of said holes for selective connection of said jib with said upright, a jack pivoted to said jib and having a hole at its inner end and a bolt adapted to enter another pair of said holes for selective connection of said jack with said upright.

4. A lifting device of the type referred to, comprising a rolling frame, an upright provided with pairs of registering holes, a jib having a hole at its inner end, a bolt adapted to enter a pair of said holes for selective connection of said jib with said upright, a block rotatably mounted on said jib, a nut rotatably mounted in said block, means for rotating said nut, a screw-threaded rod engaging said nut and having a hole at its inner end, a bolt adapted to enter another pair of said holes for selective connection of said jack with said upright.

5. In combination with a lorry, a lifting device comprising an upright provided with pairs of registering holes, a jib having a hole at its inner end, a bolt adapted to enter a pair of said holes for selective connection of said jib with said upright, a jack pivoted to said jib and having a hole at its inner end and a bolt adapted to enter another pair of said holes for selective connection of said jack with said upright and means below the lorry-frame for pivotally attaching said jib.

6. A lifting device according to claim 5 in which said jib is provided at its free end with an inclined wedgelike face and a notch adjacent the highest point of said wedgelike face, and clamping means for holding an axle in said notch.

CAMILLE DELALANDRE.